US008915106B2

(12) United States Patent
Meinel et al.

(10) Patent No.: US 8,915,106 B2
(45) Date of Patent: Dec. 23, 2014

(54) MEANS FOR PROCESSING INFORMATION

(75) Inventors: Christoph Meinel, Berlin (DE); Oliver Boeckmann, Potsdam (DE); Lutz Gericke, Potsdam (DE); Raja Gumienny, Berlin (DE); Christian Willems, Berlin (DE)

(73) Assignee: Hasso-Plattner-Institut fuer Software SystemTechnik GmbH (DE)

( * ) Notice: Subject to any disclaimer, the term of this patent is extended or adjusted under 35 U.S.C. 154(b) by 1213 days.

(21) Appl. No.: 12/775,232

(22) Filed: May 6, 2010

(65) Prior Publication Data

US 2010/0318470 A1 Dec. 16, 2010

(30) Foreign Application Priority Data

May 13, 2009 (DE) .......................... 10 2009 021 074
Mar. 31, 2010 (DE) .......................... 20 2010 004 430

(51) Int. Cl.
G06Q 10/00 (2012.01)
G06Q 10/10 (2012.01)
(52) U.S. Cl.
CPC .............. G06Q 10/00 (2013.01); G06Q 10/101 (2013.01)
USPC .......................................................... 70/300
(58) Field of Classification Search
USPC .......................................................... 705/300
See application file for complete search history.

(56) References Cited

U.S. PATENT DOCUMENTS

| | | | |
|---|---|---|---|
| 6,820,110 B1 * | 11/2004 | Engel et al. ................... 709/200 |
| 6,990,202 B2 * | 1/2006 | Wee et al. ...................... 380/200 |
| 7,162,528 B1 | 1/2007 | Simonoff et al. |
| 7,512,556 B2 * | 3/2009 | Wagner et al. ................... 705/35 |
| 7,707,084 B1 * | 4/2010 | Meinel et al. .................... 705/35 |
| 7,941,412 B2 * | 5/2011 | Dunne et al. ................... 707/694 |
| 2005/0128293 A1 * | 6/2005 | Wilsey et al. ................... 348/143 |
| 2005/0278234 A1 * | 12/2005 | Wagner et al. ................... 705/35 |
| 2007/0288374 A1 * | 12/2007 | Borchardt et al. ............... 705/42 |
| 2008/0040427 A1 * | 2/2008 | Shroff et al. ................... 709/204 |
| 2008/0088698 A1 * | 4/2008 | Patel et al. .................. 348/14.09 |
| 2008/0133660 A1 * | 6/2008 | Salesky et al. ................ 709/204 |
| 2008/0154629 A1 * | 6/2008 | Breed et al. ........................ 705/1 |
| 2008/0218582 A1 * | 9/2008 | Buckler ...................... 348/14.08 |
| 2008/0275785 A1 * | 11/2008 | Altberg et al. .................. 705/14 |
| 2009/0096860 A1 * | 4/2009 | Barreiro ...................... 348/14.07 |
| 2009/0100067 A1 * | 4/2009 | Dunne et al. .................... 707/10 |
| 2009/0309956 A1 * | 12/2009 | Hawkins et al. ........... 348/14.08 |

(Continued)

*Primary Examiner* — Dave Czekaj
*Assistant Examiner* — Kehinde O Abimbola
(74) *Attorney, Agent, or Firm* — Donald R. Boys; Central Coast Patent Agency, Inc.

(57) ABSTRACT

The invention relates to an apparatus (1) for processing information (20, 21, 22, 23) in connection with the preparation and/or development of objects by spatially distributed planning groups, the information relating to the current state of preparation and/or development. In order to enable creative working in spatially distributed planning groups, it is proposed that the apparatus (1) have the following components:
at least one output apparatus (3a, 3b) for reproducing the information (20, 21, 22, 23) at each location (2a, 2b);
at least one server (4) for processing the information (20, 21, 22, 23);
at least one connection apparatus (5a, 5b) for connecting the output apparatuses (3a, 3b) and further participant terminals (6, 7) at each location (2a, 2b);
a data communication network (8) for connecting the connection apparatuses (5a, 5b) to the server (4); and
means (10) for processing the information (20, 21, 22, 23) in such a manner that information (20, 21, 22, 23) manipulated using a terminal (6, 7) or in another manner is automatically reproduced in real time on all output apparatuses (3a, 3b) at all locations (2a, 2b).

15 Claims, 4 Drawing Sheets

(56) References Cited

U.S. PATENT DOCUMENTS

2009/0323082 A1* 12/2009 Patko et al. .................. 356/603
2010/0318470 A1* 12/2010 Meinel et al. ................. 705/300
2013/0088565 A1* 4/2013 Buckler ..................... 348/14.08

* cited by examiner

MEANS FOR PROCESSING INFORMATION

CROSS-REFERENCE TO RELATED DOCUMENTS

The present application is a Non-Provisional application of Provisional application 601/178,361, filed May 14, 2009. The present application also claims priority to German patent application serial numbers 10 2009 021 074.1, filed May 13, 2009 and 20 2010 004 430.8 filed on Mar. 31, 2010, which are incorporated herein in their entirety, at least by reference.

The present invention relates to an apparatus for processing information in connection with the preparation and/or development of objects by spatially distributed planning groups. The information to be processed relates, in particular, to the current state of preparation and/or development. In the sense of the present invention, objects which are prepared and/or developed by spatially distributed planning groups may be the design or development of technical products, the design or preparation of technical or business method sequences, the design of products and the development of designs for products and much more. In the sense of the present invention, objects are therefore any desired products or methods which can be collaboratively developed by locally distributed planning teams. In this context, locally distributed means that the teams do not have any direct contact, in particular do not have any visual contact, with one another. The different teams may therefore be located at the same location of a company but in different rooms or may be located at different locations of the same company or different companies.

Collaborative working in locally distributed teams is becoming more and more widespread, in particular against the background of moving not only production but also, increasingly, development expertise to low-income countries. Commercial video conferencing systems and screen sharing have therefore been developed further in recent years and their functionalities have been extended. However, existing solutions support creative working only to an insufficient extent.

Creative working in design or development teams is characterized by fast, simple visualization of ideas and proposals. Rewritable boards (so-called analog whiteboards) in combination with special pens in different colors, differently colored post-it notes and magnets for releasably fastening printouts, photos, etc. are generally used for this purpose. In a typical work situation, for example so-called brainstorming, each team member has a block of post-it notes in his hand and writes his ideas on notes. The post-it notes from all team members are then tacked to the whiteboard and grouped. Each team member can move or even completely remove notes. Furthermore, groups of notes are often labeled in a corresponding manner and provided with a heading. Other comments and drawings may also be directly placed on the whiteboard using special pens.

This method of operation can be intuitively understood by any person and is simple to use. However, this method of operation functions only if all team members are at the same location in front of the same whiteboard. As a result, the number of team members who can participate in the development or design of the object is limited both by their location and by their total number. In order to avoid disrupting the creative work process, it should therefore also be possible for locally distributed teams to work in a similar manner to that with the analog whiteboards. The present invention is intended to provide one possibility in this case.

In addition to the analog whiteboards which have already been mentioned, there are also digital, interactive whiteboards (compare, for example, "TeamBoard 6250" or "Teamboard MidSize 5442" from TeamBoard GmbH, Nuremberg at www.teamboard.de or "Digital Board DB565" or "Digital Board DB578" from 3M Visual Systems sold via 3M Deutschland GmbH, visual products). These digital whiteboards are optimized for presentation purposes and do not provide an adequate possibility for synchronous interaction between spatially distributed teams. That is to say, the known whiteboards have different contents in the case of spatially distributed use and have to be manually synchronized.

Furthermore, classic desktop applications are known in which each participant participates in front of his own computer and teamwork, in particular in the form of brainstorming events in front of an analog whiteboard, is not possible or is possible only to a limited extent. Such classic desktop applications are, for example, Adobe Acrobat Connect from Adobe Systems Inc., San Jose, USA or WebNotes from WebNotes, Cambridge, USA.

In the case of the analog whiteboards known from the prior art, the participants must all be at the same location with direct access to the whiteboard. For such spatially restricted development teams, the analog whiteboard provides a sufficiently convenient and practice-oriented possibility for preparing and developing objects. However, the participants in a development team have recently not all been at the same location but have been spatially distributed. For example, it is customary practice for development teams in Europe to work together with other development teams in America or Japan on the preparation or development of objects. In such a case, the known analog whiteboards do not provide a satisfactory possibility for supporting the collaboration between the spatially distributed development teams. Likewise unsatisfactory are the known classic desktop applications which, although enabling spatially distributed working, prevent creative working in development teams.

On the basis of the prior art described, the present invention is based on the object of configuring and developing the apparatus for processing information of the type mentioned at the outset to the effect that creative working in spatially distributed planning groups for preparing and/or developing objects is supported. In this case, the ability to operate the apparatus in as simple and intuitive a manner as possible by the participants and the preservation of the team concept should have priority.

In order to achieve this object, it is proposed, on the basis of the apparatus for processing information of the type mentioned at the outset, that the apparatus have the following components:
- at least one output apparatus for reproducing the information at each location of the planning groups;
- at least one server for processing the information and for coordinating the interaction between the components of the apparatus;
- at least one connection apparatus for connecting the output apparatuses and further participant terminals, which are used to manipulate the information inside the planning group, at each location of the planning groups;
- a data communication network for connecting the connection apparatuses to the server; and
- means for processing the information in such a manner that information manipulated using one of the connected participant terminals or in another manner is automatically reproduced in real time on the output apparatuses of all planning teams.

The apparatus according to the invention supports the method of operation of conventional analog whiteboards, which can be intuitively understood by each participant and is simple to use, and extends this method of operation to use in the case of spatially distributed teams with digital output apparatuses. The creative work processes are also maintained for locally distributed teams by the apparatus according to the invention. In particular, the apparatus supports the following functions:

a) The participants in the different planning groups may write notes (for example in the form of digital post-its) either directly on the output apparatus if it is in the form of a touch-sensitive whiteboard, for example, using a suitable digital pen or in a horizontal orientation, for example on a tablet PC which is connected to the server of the apparatus according to the invention via the connection apparatus, with the result that the notes containing the information input via the tablet PC are automatically reproduced in real time on all output apparatuses of the apparatus according to the invention.

b) The notes which have been written can be reproduced at any desired positions on the output apparatus. It is also possible to move the notes on the output apparatus.

c) The notes reproduced on the output apparatus may be grouped as desired in groups (so-called clusters).

d) The notes reproduced on the output apparatus can be removed or deleted from the output apparatus as desired.

e) If the output apparatus is in the form of an interactive digital whiteboard, any desired text and drawings can be written or drawn on the output apparatus, for example using a suitable digital pen. Alternatively, the text and drawings can also be input using a terminal (for example a tablet PC, a PDA, a laptop, a notebook, a netbook, etc.) which is connected to the server via the connection apparatus, the text and drawings which have been input then being processed by the means for processing the information in such a manner that they are displayed on all output apparatuses in real time.

f) Text and drawings may be deleted individually or in groups, either directly on the output apparatus or via a connected terminal.

g) All actions on one of the output apparatuses become visible in real time to all spatially distributed team members at the different locations, that is to say the state of the output apparatuses is always kept synchronous at all spatially distributed workstations of the distributed team. Only this makes it possible to practice creative working in spatially distributed teams since it is ensured that all teams actually receive the same current information displayed on their output apparatuses.

h) Each item of information reproduced on the output apparatus can be manipulated by each of the members in the planning groups, irrespective of the location of the members.

i) The interactions on the output apparatuses are similar to the work on an analog whiteboard, that is to say the operations of manipulating the information reproduced by the output apparatuses are also possible without a computer mouse or a computer keyboard and are modeled on the tools of analog whiteboards. For example, there are different digital pens which can be used to write or draw on the output apparatuses as well as digital "sponges" for deleting a part of the information reproduced on the output apparatus.

Further expedient extensions of the invention relate, for example, to:

j) moving text, drawings and virtual post-it notes directly on the output apparatus if the latter is touch-sensitive;

k) simultaneously manipulating (for example deleting, moving, scaling, zooming, etc.) groups of text, drawings, graphics and/or post-it notes;

l) automatically storing and recalling previous contents reproduced by the output apparatus at particular times or in the case of particular events;

m) inserting multimedia contents, for example digital photos, audio and video files.

The architecture of the apparatus according to the invention enables message-based synchronization of contents of the output apparatus on different heterogeneous input and output devices. Data transmission via the network for synchronizing the contents of the different output apparatuses is effected using customary communication protocols, preferably using the Internet Protocol (IP). Any desired protocols from layer 3 (network layer) or layer 4 (transport layer) of the OSI layer model can be used as alternative communication protocols.

The contents of the output apparatuses are preferably centrally held on the server. In this case, only the changes to or manipulations of the contents, which are carried out on one of the output apparatuses or on the one of the terminals, have to be transmitted, via the connection apparatus and the network, to the server where a file is then accordingly updated using the contents of the output apparatuses. Either only the changed parts of the updated contents of the output apparatuses or else the entire contents are then transmitted from the server to all output apparatuses and incorporated terminals (for display on screens assigned to the terminals) via the network and the connection apparatuses. This embodiment has the advantage that relatively few data items have to be transmitted via the network. In addition, most information processing operations needed for the real-time synchronization of the output apparatuses and the screens of the terminals are carried out by the server which can be designed to be appropriately powerful without any problems. The server relieves the terminals of these operations, with the result that smaller and less powerful terminals (for example mobile telephones, PDAs) can also be incorporated in the processing apparatus according to the invention and can effectively contribute to updating and outputting contents of the digital whiteboard.

Input and output devices may also be integrated in the same device, for example in the form of a touch-sensitive interactive digital whiteboard, in the form of a laptop or in the form of a PC with a keyboard for inputting information and a screen for outputting information. There is at least one output apparatus, preferably in the form of a digital whiteboard, for each planning group at one of the spatially distributed locations. It is conceivable for a plurality of output apparatuses to also be available to larger planning groups so that each team member has a comfortable view of the output apparatus and has convenient access to the output apparatus.

The digital whiteboard can technically be implemented in different ways, for example by means of a touch-sensitive screen, in particular using LED or plasma technology, or in the form of a projector which projects the information onto a projection screen. All actions on one of the output apparatuses, that is to say, in particular, the writing of text, the drawing of graphics, the creation and affixing of virtual post-it notes, the manipulation of the displayed information etc., are also always carried out in real time on the other output apparatuses, with the result that the contents of all output apparatuses are synchronized and are always the same and current. As a result, spatially distributed planning groups can collaborate in real time using creative working techniques.

The different input and output devices which can be used to incorporate the participants of the planning groups in the overall system are one particular aspect of the present invention. The following hardware, in particular, is considered as input devices: digital pens, tablet PCs, computers with a keyboard and mouse input, smartphones and digital whiteboards. Digital whiteboards and computer screens, displays of smartphones or PDAs or projectors (in conjunction with a computer) are considered, in particular, as output devices. The different input and output devices are connected in a manner independent of the technology.

As a result of the design described, the apparatus according to the invention has the following advantageous properties:

every action (for example creating, moving or deleting text, a drawing or a note etc.) by a team member on one of the interactive output apparatuses is immediately transmitted to the spatially distributed locations and is reproduced there on the corresponding output apparatuses;

it is always possible for all members of the planning groups (including the members who are spatially remote) to actively and simultaneously access the reproduced information;

work with the apparatus according to the invention, in particular work on the interactive output apparatuses which are arranged in a distributed manner in the individual planning groups, essentially corresponds to working on a conventional analog whiteboard and makes it possible, in this manner, for even users who know little about computers and modern telecommunication technology to interact with the apparatus according to the invention and the interactive output apparatuses without a large amount of learning and time;

the apparatus according to the invention and the interactive output apparatuses also have possibilities which can be implemented only in a digital manner: calling up earlier contents of the output apparatus; moving and enlarging or changing the color of reproduced information. After particular information reproduced by the output apparatus has been enlarged, only an extract of the entire contents is displayed on the output apparatus. This enlarged view can be moved, as it were, over the entire contents of the output apparatus as a type of magnifying glass. The entire contents of the output apparatus can then be displayed again by reducing the size of the selected information.

Further features and advantages of the present invention are explained in more detail below using the figures, in which.

Figure 3A:
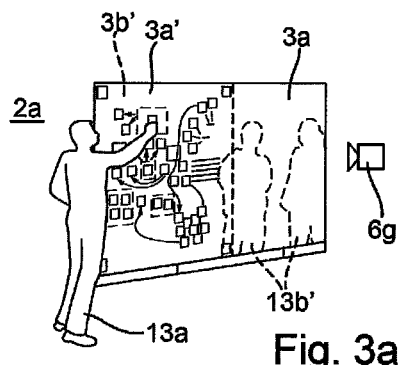
Figure 3B:
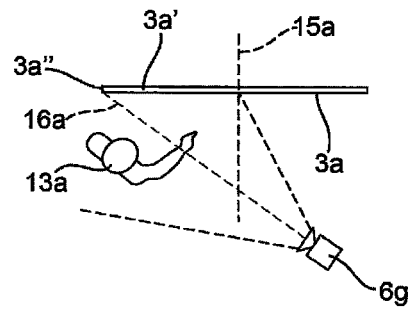
Figure 4A:
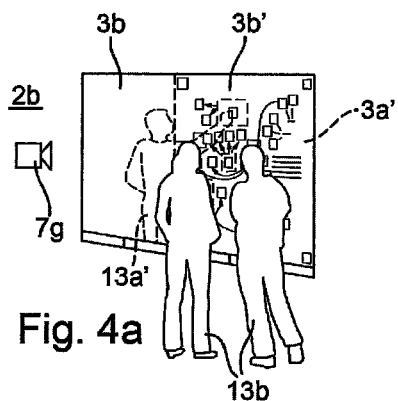
Figure 4B:
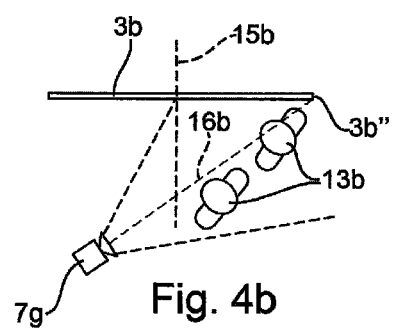
Figure 5A:
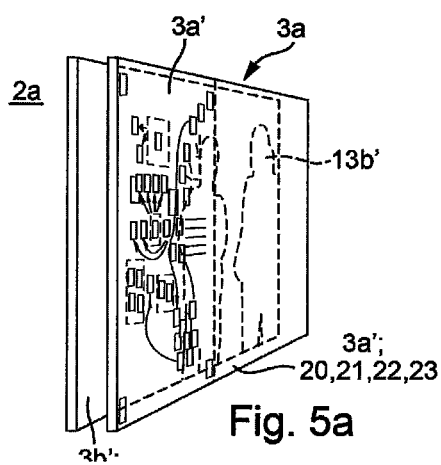
Figure 5B:
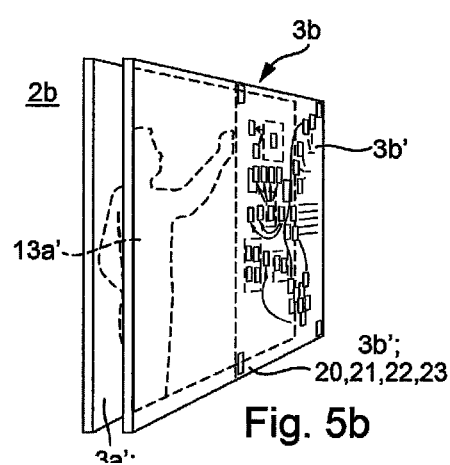
Figure 6:
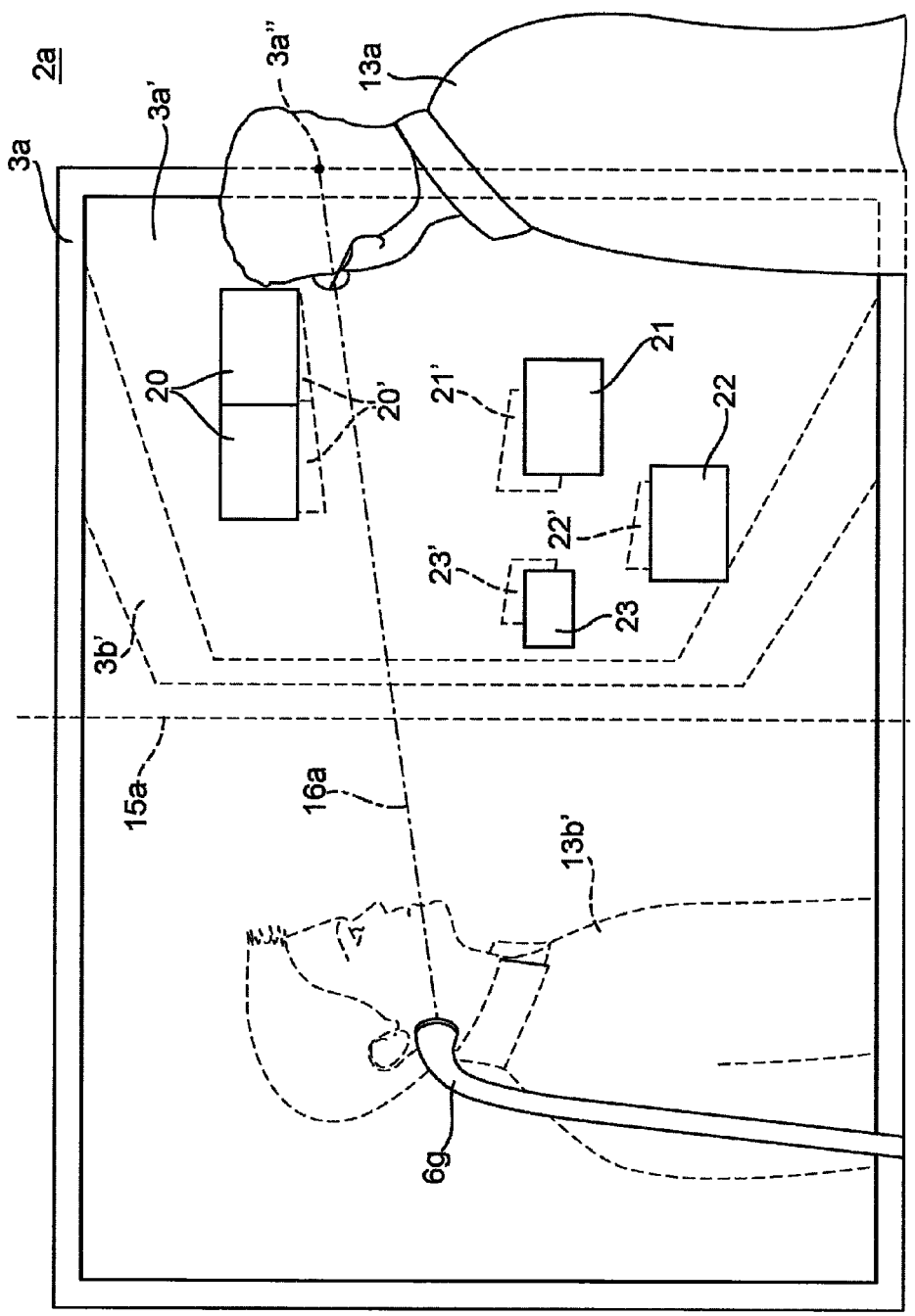

FIG. 3*a* shows a perspective view of parts of a preferred embodiment of the apparatus according to the invention at a first location;

FIG. 3*b* shows a plan view of the parts of the apparatus from FIG. 3*a* at the first location;

FIG. 4*a* shows a perspective view of other parts of the preferred embodiment of the apparatus according to the invention at another location;

FIG. 4*b* shows a plan view of the parts of the apparatus from FIG. 4*a* at the other location;

FIG. 5*a* shows a perspective schematic view of the output apparatus in the embodiment from FIG. 3*a* at the first location;

FIG. 5*b* shows a perspective schematic view of the output apparatus in the embodiment from FIG. 3*a* at the first location; and FIG. 6 shows a perspective view of the output apparatus in the preferred embodiment of the invention at one of the locations.

Figure 1:
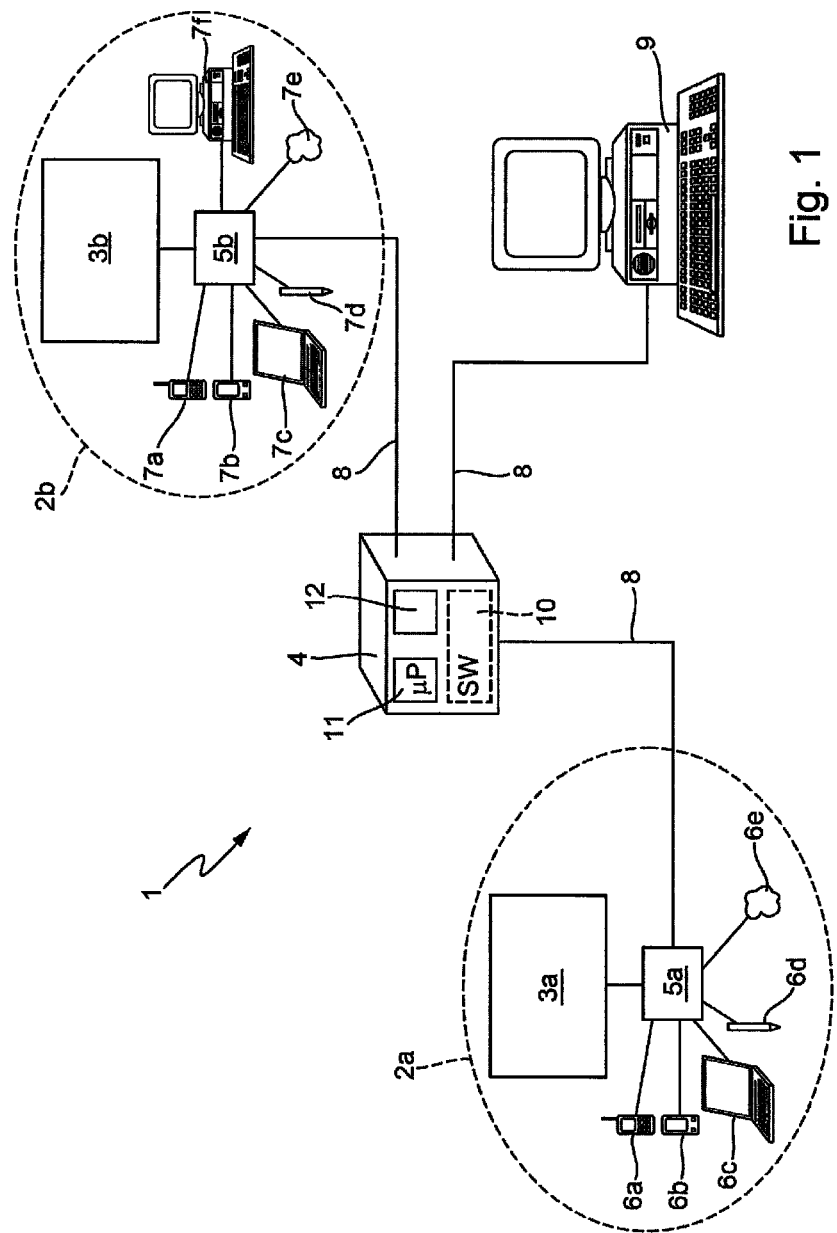
FIG. 1 shows an apparatus according to the invention for processing information according to one preferred exemplary embodiment.

The apparatus according to the invention for processing information in connection with the preparation and/or development of objects by spatially distributed planning groups is denoted overall using the reference symbol 1 in FIG. 1. The information to be processed preferably relates to the current state of preparation and/or development of the object. The object may be, for example, the development of a technical product, the creative design of an item, the preparation of a project or method and thus associated steps or any desired other object which can be prepared, developed or designed by means of creative working in a team.

FIG. 1 symbolizes the spatially distributed locations of the different planning groups by means of a dashed circular line denoted using the reference symbols 2*a* and 2*b*. There may be one or more planning groups at each of the locations 2*a*, 2*b*. At least one output apparatus 3*a*, 3*b* for reproducing the information processed by the apparatus 1 is arranged in each of the planning groups at the distributed locations 2*a*, 2*b*. The output apparatuses 3*a*, 3*b* are preferably in the form of interactive digital whiteboards. The latter may be implemented, for example, in the form of a touch-sensitive screen, in particular an LED or plasma flat-panel screen, or in the form of a projector which projects the information to be reproduced onto a projection screen. It is conceivable for the projection screen to also be touch-sensitive. In the example illustrated, the output apparatuses 3*a* and 3*b* are in the form of touch-sensitive LED screens, but the present invention is not intended to be restricted to this exemplary embodiment.

The apparatus 1 also comprises at least one server 4 for processing the information and for coordinating the interaction between the different components of the apparatus 1 in the manner according to the invention. The server 4 may be arranged at one of the locations 2*a*, 2*b* or at any desired other location.

In addition, at least one connection apparatus 5*a*, 5*b* for connecting the output apparatuses 3*a*, 3*b* and participant terminals 6, 7, which are used to manipulate the information inside the planning group, is provided at each of the locations 2*a*, 2*b*, preferably in each of the planning groups. The terminals 6, 7 may be, for example, in the form of a mobile telephone 6*a*, 7*a*, a smartphone or a PDA 6*b*, 7*b*, a laptop, a notebook, a netbook 6*c*, 7*c*, a digital pen 6*d*, 7*d*, a digital sponge 6*e*, 7*e* or a personal computer (PC) 7*f*. The connection apparatuses 5*a*, 5*b* operate in a manner independent of the technology, with the result that the participant terminals 6, 7 may be designed in virtually any desired manner. In particular, the terminals 6, 7 may originate from any desired manufacturers, may operate with any desired (customary) operating systems (for example Windows, Mac OS, Linux, Palm OS, Windows CE, Windows Mobile, Apple OS for iPhone, Symbian OS and Blackberry OS) and may be connected to the connection apparatuses 5*a*, 5*b* via any desired (customary) interfaces.

The hardware and software of the terminals 6, 7 must only be designed in such a manner that the terminals can be used to generate and manipulate information (for example text, graphics, drawings, multimedia contents, virtual post-it notes, etc.). The information generated must be able to be transmitted, via the connection apparatus 5*a*, 5*b*, to the server 4 in a format which is understood by the server 4 and the software running on the latter. In order to generate the information, suitable software which allows the information (for example text, drawings, graphics, audio contents, multimedia contents, virtual post-it notes, etc.) to be generated using the input means (for example keyboard, microphone, video camera, mouse, digital pen, etc.) present in the participant terminal 6, 7 runs on the participant terminal 6, 7.

The participant terminals 6, 7 are connected to the connection apparatuses 5a, 5b in either a wired or a wireless manner. The connection apparatuses 5a, 5b may have a multiplicity of different interfaces which can be used to connect different participant terminals 6, 7. For example, it is conceivable for the participant terminals 6, 7 to be connected via a serial or parallel interface, a USB interface, an infrared interface, a Bluetooth interface, a WLAN interface or a WiFi interface. It goes without saying that the connection apparatuses 5a, 5b may also comprise other interfaces which can be used to transmit data according to protocols other than those expressly mentioned.

The apparatus 1 also comprises a data communication network 8 which connects the connection apparatuses 5a, 5b to the server 4. The data communication network 8 may be a proprietary, in-house network. However, it is also conceivable for the Internet to be used as the data communication network 8. In this case, data communication between the connection apparatuses 5a, 5b and the server 4 would take place in a packet-switched manner, in particular according to the Internet Protocol (IP). The further data transmission between the connection apparatuses 5a, 5b and the output apparatuses 3a, 3b or the other participant terminals 6, 7 can likewise take place either according to the IP or according to another suitable data transmission protocol.

In the exemplary embodiment illustrated in FIG. 1, a service computer 9 is also connected to the server 4 via the data communication network 8. The service computer 9 can be used to set up and configure the server 4 and software 10 running on the latter and thus the entire apparatus 1 according to the invention. The service computer 9 can be arranged in the spatial vicinity of the server 4, at one of the locations 2a, 2b or at any desired other location. Unlike the illustration in FIG. 1, the service computer 9 can also be connected to the server 4 directly, that is to say not via the network 8. It would even be conceivable for the service computer 9 and the server 4 to be implemented in the same computer. In this case, the server 4 could be in the form of software running on the computer 9. The interfaces of the service computer 9, which could be driven by corresponding parts of the server software 4 via the operating system of the computer 9, could be used to connect the server software 4 to the network 8. The software 10 would then be part of the server software 4.

In the exemplary embodiment shown in FIG. 1, the server 4 is in the form of an independent computer comprising at least one processor 11 on which the software 10 can be executed. The server 4 also has a storage medium 12 (for example hard disk, flash memory, or the like) on which the software 10 as well as settings and configuration parameters of the software 10 and of the entire apparatus 1 are stored, for example. Furthermore, the contents of the output apparatuses 3a, 3b at particular times or in the case of particular events can be stored on the storage medium 12 either automatically at predefined times or in the case of predefined events or manually in response to a command from one of the participants in the planning groups. These contents can then be retrieved again either automatically or manually, with the result that an interrupted session for developing or preparing an object can be continued in a seamless manner.

Figure 2:
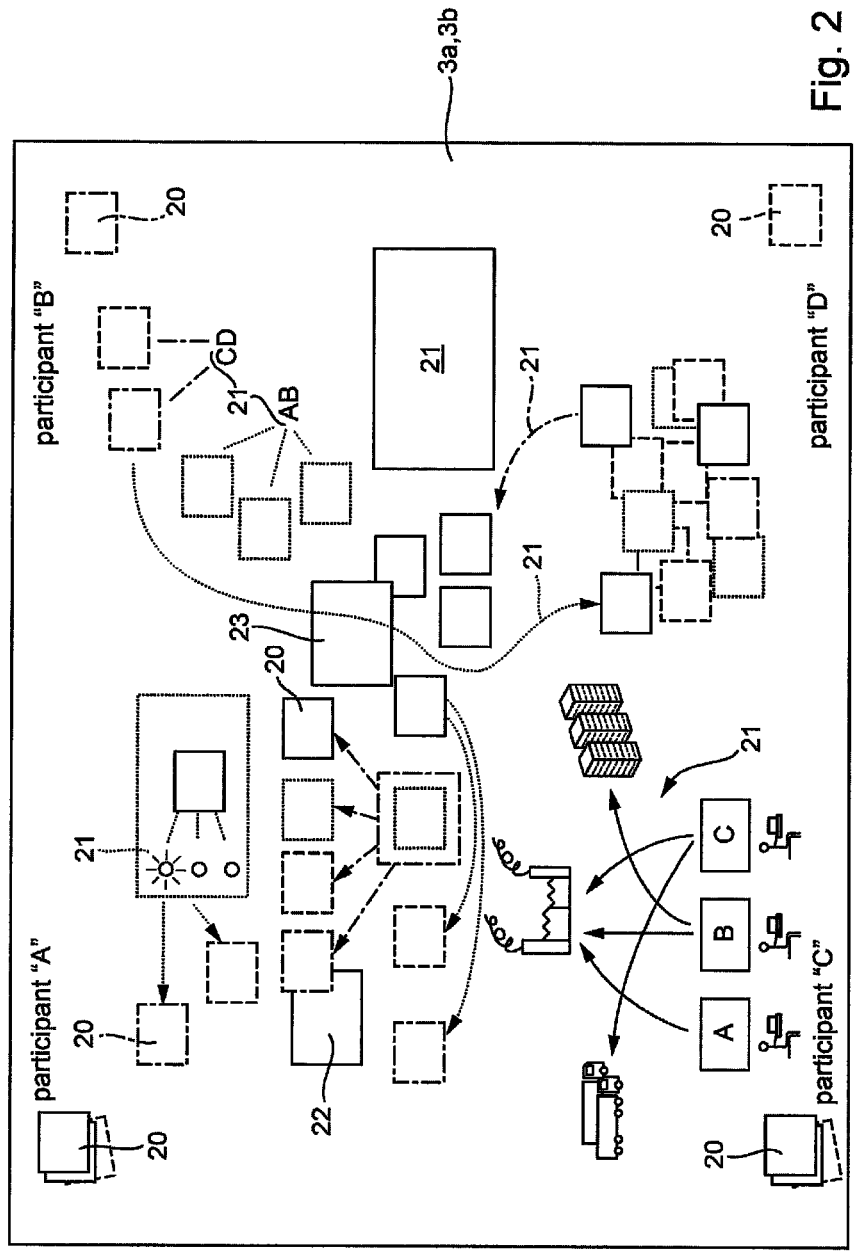
FIG. 2 shows an example of the contents of the output apparatuses with a multiplicity of different items of information reproduced on the latter.

FIG. 2 shows an example of the contents of the output apparatuses 3a, 3b. It goes without saying that the information items illustrated, in particular their number, size, arrangement, color etc., may vary from case to case in practice and are used only to illustrate the present invention.

Each of the four corners of the output apparatus 3a, 3b can be assigned to a participant A to D in the two planning groups at the locations 2a, 2b. It would be conceivable, for example, for the participants A and B to be at the first location 2a and for the participants C and D to be at the second location 2b. It would also be conceivable to provide additional areas along the edge of the output apparatus 3a, 3b for additional participants. It would likewise be conceivable to assign the corners to planning groups or locations, rather than to individual participants.

The participants generate information objects (for example virtual post-it notes) using the participant terminals 6, 7, which are connected to the server 4 via the connection apparatus 5a, 5b, or directly on the output apparatuses 3a, 3b and provide said information objects with the desired contents (for example text or graphics). Suitable participant terminals 6, 7 can also be used to directly determine the position of information objects on the output apparatuses 3a, 3b. Post-it notes are illustrated by way of example and are denoted using the reference symbol 20 in FIG. 2. The information objects generated on one of the terminals 6, 7 or on one of the output apparatuses 3a, 3b are then transmitted to all of the output apparatuses 3a, 3b of the apparatus 1 according to the invention via the connection apparatuses 5a, 5b and the server 4 in response to a command from the participant who generated said objects or automatically and are displayed on said output apparatuses. In the example in FIG. 2, the information object 20 generated by a participant and transmitted to the output apparatus 3a, 3b is first of all displayed in that corner which is assigned to the participant who generated the information object 20.

The generated information objects 20 displayed in the corners of the output apparatus 3a, 3b can then be manipulated by any desired participants in all planning teams at any desired location. In particular, the information objects 20 may be moved from the corners to other places on the output apparatus 3a, 3b. In the case of an output apparatus 3a, 3b in the form of an interactive whiteboard, this can be carried out, in particular, by the participant touching the information object 20 to be manipulated on the output apparatus 3a, 3b either with his hand or using a special digital device (for example a special pen) and pulling it to the desired place. Alternatively, the manipulation can also be carried out using one of the connected terminals 6, 7. For example, the contents of the output apparatuses 3a, 3b can be displayed on a screen of a laptop 6c, 7c. The information object 20 to be manipulated is clicked on using the mouse and is pulled to a desired place on the screen corresponding to a place on the output apparatus 3a, 3b. The operations of manipulating the information object 20 which are carried out by whatever means are automatically displayed in real time on all output apparatuses 3a, 3b. It goes without saying that the manipulations are also automatically displayed in real time on the screens of the connected terminals 6, 7. This ensures that all participants are always at the same current level with respect to the state of preparation or development of the object.

It goes without saying that the manipulation of the information objects 20 is not restricted to moving the objects on the output apparatus 3a, 3b. It may also comprise changing the background color of the virtual post-it notes 20, changing the size or contents of the post-it notes 20 or deleting the post-it notes 20.

The present invention considers, in particular, the practice of creating the virtual digital post-it notes 20 using the mobile participant terminals 6, 7 (for example a mobile telephone 6a, 7a, a smartphone 6b, 7b, a tablet PC, digital pens 6d, 7d, graphics tablets etc.) and inputting and manipulating the contents of said notes. The digital post-it notes 20 can also be created using the keyboard of a laptop 6c, 7c or PC 7f, the text on the post-it note 20, despite being input via the keyboard, being displayed on the output apparatuses 3a, 3b in handwritten form, preferably even in the handwriting of the respective participant, in order to have the feeling of "real" notes. In addition, it is conceivable for virtual post-it notes 20 to be generated directly on the output apparatus 3a, 3b using a suitable pen, a so-called digital pen 6d, 7d, and for the contents to be input if the output apparatus 3a, 3b is in the form of an interactive whiteboard.

As part of the manipulation of the post-it notes 20, the latter may also be grouped into groups (so-called clusters). Clusters are formed by the spatial vicinity of the post-it notes on the output apparatus 3a, 3b and by circling them using a digital marker (digital pen). The clusters can also be labeled. The post-it notes 20 can be moved by pulling them with a finger, a corresponding digital pen 6d, 7d or a corresponding device. Provision is even made for entire clusters of different post-it notes 20 to be moved, enlarged and made smaller on the output apparatus 3a, 3b. It is likewise conceivable to extend the work surface of the output apparatus 3a, 3b in all directions, such that a quasi-infinitely large work or output surface is produced as it were, of which only an extract is displayed on the output apparatus 3a, 3b. The entire work or output surface can be displayed on the output apparatus 3a, 3b on a smaller scale by reducing the size of the extract displayed on the output apparatus 3a, 3b.

Furthermore, the participants in the planning groups at the different locations 2a, 2b can use a suitable digital pen 6d, 7d, for example, to directly input text and drawings to the output apparatuses 3a, 3b if the latter are in the form of an interactive whiteboard. Examples of text and drawings input in this manner are denoted using the reference symbol 21 in FIG. 2. Ideas can be efficiently communicated using simple line drawings on the whiteboard 3a, 3b. The text and drawings input directly via the whiteboard 3a, 3b are automatically displayed immediately afterward, that is to say in real time, on the output apparatus 3a, 3b on which the input was made as well as virtually simultaneously on all other output apparatuses 3a, 3b at the other locations 2a, 2b, likewise in real time. The text and drawings can be changed using digital pens 6d, 7d and a digital sponge 6e, 7e for removing the text and drawings which have been input, and the ideas can thus be developed further in the team. The apparatus 1 according to the invention supports hand drawings 21 and handwriting on the output apparatus 3a, 3b. Drawings can be combined or shared. This facilitates the operations of moving and zooming (enlarging or reducing the size of) drawings and text 21 or initially makes them possible.

Furthermore, it is possible for the participants in the planning groups to use the terminals 6, 7 or to directly use the output apparatuses 3a, 3b to call up graphics (for example photos, scanned documents, etc.) and have them displayed on the output apparatuses 3a, 3b. A graphics item is denoted using the reference symbol 22 in FIG. 2. The graphics 22 are preferably stored on a storage medium assigned to the terminal 6, 7 or to the output apparatus 3a, 3b, for example the storage medium 12 of the server 4 which can be accessed via the data network 8, and are called up from there as the contents of a new information object 22. The graphics 22 are then not only output on the output apparatus 3a, 3b assigned to the participant who generated them or on the screen of a terminal 6, 7, which screen is assigned to this participant, but are reproduced on all output apparatuses 3a, 3b of the apparatus 1. Changes to the graphics 22 are likewise automatically output in real time on all other output apparatuses 3a, 3b or all screens of the terminals 6, 7. Changes to the graphics 22 relate, for example, to the position of said graphics on the output apparatuses 3a, 3b and to the size of said graphics. It is conceivable that other properties of the graphics 22, for example color, resolution, image processing effects, can also be changed.

In addition, the apparatus 1 according to the invention also supports the processing of multimedia contents 23 which can be used as follows in creative development teams: the multimedia contents may be, for example, films (videos with or without sound) of interviews or observations of current processes, method sequences or situations. However, the multimedia contents 23 may also be pure audio recordings of interviews. Photos 22 of people, environments, products etc. can also be referred to as multimedia contents 23. In this respect, there is, as it were, an overlap between the graphics 22 and the multimedia contents 23. Finally, the multimedia contents 23 may also comprise contents of websites, pages of books, journal excerpts, etc.

Most of the information 20, 21, 22, 23 displayed on the output apparatus 3a, 3b is created in digital form. The present invention makes it possible to conveniently import digital media contents to the display apparatus 3a, 3b and to manipulate said contents there. The apparatus 1 is designed in such a manner that it is possible to work directly on the output apparatus 3a, 3b: the files transmitted from digital cameras and other devices 6, 7 and corresponding placeholders are provided at the margins of the output apparatuses 3a, 3b. A participant can then fan out this "stack" of information (file contents) and can manipulate the individual items of information on the output apparatus 3a, 3b as desired. An important aspect of the present invention can be seen to be the automatic synchronization of the individual distributed output apparatuses 3a, 3b (including the screens of the terminals 6, 7) in real time. Only this measure enables efficient creative working in spatially distributed planning groups.

The apparatus 1 according to the invention enables creative working for spatially distributed teams. The overall system supports all functions which were previously also possible in the analog world when using analog whiteboards and—in contrast to all other products previously available on the market—provides intuitive working with a small amount of learning. The variety of possible input and output devices 3a, 3b, 6, 7 which can be used by each team member depending on technical equipment and personal preference and can be used to incorporate the team member in the overall apparatus 1 via the connection apparatuses 5a, 5b is also particularly advantageous. For this purpose, the connection apparatuses 5a, 5b are equipped both with hardware and software such that the wide variety of terminals 6, 7 can be connected to the connection apparatuses 5a, 5b and thus to the overall system 1 via a multiplicity of different (customary) protocols and interfaces.

The present invention can be implemented in a particularly advantageous manner by the software 10 which runs on the server 4. This software 10 ensures that the information input via the participant terminals 6, 7 or directly via the output apparatuses 3a, 3b is displayed on all output apparatuses 3a, 3b of the overall system 1. The software 10 also ensures that manipulation of the displayed information is automatically displayed in real time on all output apparatuses 3a, 3b (including screens of the terminals 6, 7). Finally, it is also conceivable for the software 10 to also be responsible for connecting the terminals 6, 7 to the connection apparatuses 5a, 5b and ultimately also to the server 4 and for the software to be configured in such a manner that virtually any desired terminals 6, 7 (different manufacturers, different interfaces, different data communication protocols) can be connected to the server 4 via the connection apparatuses 5a, 5b and can be incorporated in the overall system 1.

A particularly preferred embodiment of the apparatus 1 according to the invention is explained in more detail below using FIGS. 3 to 6. In this case, the participant terminals 6, 7 at each of the locations 2a, 2b each comprise at least one video camera. The two locations 2a and 2b are shown in FIGS. 3a and 3b and 4a and 4b, respectively. A respective video camera 6g and 7g is arranged at a distance from the output apparatus 3a and 3b. It goes without saying that more than the one video camera 6g, 7g illustrated may also be provided. The video camera 6g at the first location 2a records at least one part of the contents of the first output apparatus 3a assigned to the first location 2a as well as a person 13a in the planning group who is in front of the first output apparatus 3a (cf. FIGS. 3a and 3b). In a corresponding manner, the other video camera 7g at the other location 2b records at least one part of the contents of the further output apparatus 3b assigned to the other location 2b as well as people 13b in the planning group who are in front of the further output apparatus 3b (cf. FIGS. 4a and 4b). The camera images recorded by the two video cameras 6g and 7g are transmitted to the server 4 via the connection apparatuses 5a, 5b and the data communication network 8 and are processed in said server if necessary. The processing may be carried out in this case in such a manner that the camera images can be output in a desired manner on the output apparatus 3b and 3a assigned to the respective other location 2b and 2a.

The camera images recorded by the camera 7g at the other location 2b comprise a part 3b' of the contents of the further output apparatus 3b as well as images 13b' of the people 13b. The camera images from the other location 2b are output or displayed on the output apparatus 3a at the first location 2a. The images 13b' of the people 13b at the other location 2b are reproduced on the output apparatus 3a in FIG. 3a. That part 3b' of the contents of the further output apparatus 3b which is recorded by the camera 7g and is output on the first output apparatus 3a at the first location 2a is superimposed on the actual contents of the output apparatus 3a. The reproduced part 3b' of the further output apparatus 3b is therefore only illustrated on the first output apparatus 3a in FIG. 3a using dashed lines. In a corresponding manner, the camera images recorded by the camera 6g at the first location 2a comprise a part 3a' of the contents of the further output apparatus 3a as well as an image 13a' of the person 13a. The camera images from the first location 2a are output or displayed on the output apparatus 3b at the other location 2b. The image 13a' of the person 13a at the first location 2a is reproduced on the further output apparatus 3b in FIG. 3b. That part 3a' of the contents of the first output apparatus 3a which is recorded by the camera 6g and is output on the further output apparatus 3b at the other location 2b is superimposed on the actual contents of the further output apparatus 3b and is therefore only illustrated on the further output apparatus 3b in FIG. 3b using dashed lines. The camera images recorded by the cameras 6g and 7g and the information 20, 21, 22, 23 displayed on the output devices 3b and 3a are superimposed in such a manner that the information 20', 21', 22', 23' contained in the camera images is superimposed on the information 20, 21, 22, 23 displayed on the output apparatuses 3b and 3a of the planning teams.

The camera 6g at the first location 2a is laterally offset with respect to a perpendicular center plane 15a running through the output apparatus 3a assigned to the location 2a and is oriented in such a manner that an optical axis 16a of the camera 6g is essentially directed toward a lateral edge 3a" on that side of the first output apparatus 3a which is opposite the camera 6g with respect to the center plane 15a (cf. FIG. 3b). In a corresponding manner, the camera 7g at the other location 2b is laterally offset with respect to a perpendicular center plane 15b running through the output apparatus 3b assigned to the location 2b and is oriented in such a manner that an optical axis 16b of the camera 7g is essentially directed toward a lateral edge 3b" on that side of the further output apparatus 3b which is opposite the camera 7g with respect to the center plane 15b (cf. FIG. 4b).

The distance between the camera 6g at the first location 2a and the output apparatus 3a assigned to the location 2a is selected in such a manner that the camera 6g records a subarea 3a' of the contents of the first output apparatus 3a, which subarea extends from the center plane 15a to that lateral edge 3a" of the output apparatus 3a which is opposite the camera 6g with respect to the center plane 15a (cf. FIG. 3b). In a corresponding manner, the distance between the camera 7g at the other location 2b and the further output apparatus 3b assigned to the location 2b is selected in such a manner that the camera 7g records a subarea 3b' of the contents of the further output apparatus 3b, which subarea extends from the center plane 15b to that lateral edge 3b" of the output apparatus 3b which is opposite the camera 7g with respect to the center plane 15b (cf. FIG. 4b).

When reproducing the camera images on the output devices 3a and 3b at the respective other location 2a and 2b, this results in an important aspect of the described embodiment, according to which the images 13a' and 13b' of the people 13a and 13b are at least largely displayed on that part of the output apparatus 3b and 3a which is not recorded by the associated cameras 7g and 6g (cf. FIGS. 3a and 4a).

It is particularly preferred if the optical axes 16a, 16b of the cameras 6g, 7g are oriented in the vertical direction approximately at eye level with respect to the people 13a, 13b in the planning teams. In other words, the optical axes 16a, 16b meet the output apparatuses 3a and 3b to be recorded approximately at the level of the eyes of the people 13a, 13b.

The superimposition of the information 3a' (comprising 20, 21, 22, 23) displayed on the first output apparatus 3a, on the one hand, and the camera image 3b' (comprising 20', 21', 22', 23' and 13b') from the video camera 7g that is reproduced on the output apparatus 3a, on the other hand, is diagrammatically illustrated in FIG. 5a. The superimposition of the information 3b' (comprising 20, 21, 22, 23) displayed on the further output apparatus 3b, on the one hand, and the camera image 3a' (comprising 20', 21', 22', 23' and 13a') from the video camera 6g that is reproduced on the output apparatus 3b, on the other hand, is likewise diagrammatically illustrated in FIG. 5b.

FIG. 6 uses the output apparatus 3a at the first location 2a to show, by way of example, the specific contents of the output apparatus 3a. The person 13a is standing in front of the output device 3a and is looking at the output apparatus 3a and the contents of the latter. The center plane 15a is diagrammatically depicted. The camera 6g is arranged in front of the output apparatus 3a on that side of the center plane 15a which is opposite the person 13a. As stated, the camera is oriented in such a manner that its optical axis 16a meets the edge 3a" on the opposite side of the output apparatus 3a approximately at the person's 13a eye level. In a corresponding manner, the person 13b and the camera 7g are arranged in front of the further output apparatus 3b at the other location 2b.

On the one hand, information 3a' which may comprise information objects, for example post-it notes 20, text and drawings 21, graphics 22 or multimedia contents 23, is displayed on the output apparatus 3a. On the other hand, a camera image from the camera 7g at the other location 2b is reproduced on the output apparatus 3*a*. The camera image comprises, on the one hand, an image 13*b*' of the person 13*b* at the other location 2*b*. On the other hand, the camera image comprises an image 3*b*' of the contents of the further output apparatus 3*b* at the other location 2*b*. The image 3*b*' of the contents of the further output apparatus 3*b* may comprise images of information objects, for example images 20' of post-it notes 20, images 21' of text and drawings, images 22' of graphics or images 23' of multimedia contents. The camera image from the camera 7*g* at the other location is superimposed on the contents 3*a*' of the output apparatus 3*a*, with the result that both are displayed on the output apparatus 3*a*.

The first output apparatus 3*a* extends in a plane of extent which runs approximately parallel to the plane of the drawing in FIG. 6. It can be clearly seen from FIG. 6 that the arrangement of the video camera 7*g* and the reproduction of the camera images on the output apparatus 3*a* are coordinated with one another in such a manner that a plane of extent of the image 3*b*' of the further output apparatus 3*b* in the camera image from the video camera 7*g* displayed on the output apparatus 3*a* runs at an oblique angle to the plane of extent of the output apparatus 3*a*. In a corresponding manner, the arrangement of the video camera 6*g* and the reproduction of the camera images on the further output apparatus 3*b* at the other location (not illustrated in FIG. 6) are also coordinated with one another. This makes it possible for the person 13*a* standing in front of the output apparatus 3*a* at the first location 2*a* and the person 13*b*' standing at the other location 2*b* and displayed on the output apparatus to face one another, with the result that particularly effective working in the spatially distributed planning teams is possible. The angle between the planes of extent of the output apparatus 3*a* and of the image 3*b*' of the further output apparatus 3*b* is approximately 45°.

It can be seen particularly well in FIG. 6 that the information objects 20, 21, 22, 23 displayed on the first output apparatus 3*a* and the images 20', 21', 22', 23' of the contents 3*b*' of the further output apparatus 3*b*, which are likewise displayed on the first output apparatus 3*a*, are superimposed at least in areas. The information objects 20, 21, 22, 23 displayed on the first output apparatus 3*a* can be selected together with the corresponding images 20', 21', 22', 23' of the contents 3*b*' of the further output apparatus 3*b* by the person 13*a* standing in front of the first output apparatus, for example by circling the desired objects using a finger on a touch-sensitive output apparatus 3*a*. The selected objects 20, 21, 22, 23 are then marked together with the corresponding images 20', 21', 22', 23', for example by changing the color or by highlighting them in another manner, and can be processed together on the output apparatus 3*a*. The processing operation may comprise, for example, deleting, copying, inserting or moving the selected objects 20, 21, 22, 23 and the corresponding images 20', 21', 22', 23'. The objects can be moved, for example, by pulling the selected objects 20, 21, 22, 23 and the corresponding images 20', 21', 22', 23' to another place of the output apparatus 3*a*. The objects 20, 21, 22, 23 and the corresponding images 20', 21', 22', 23' are displayed and processed on the further output apparatus 3*b* at the other location 2*b* in a corresponding manner.

The invention claimed is:

1. An apparatus coordinating activities of planning groups, comprising:
a first planning group at a first physical location comprising a first electronic display apparatus visible to each of a plurality of participants interacting at the first planning group, a first video camera, a first plurality of computerized appliances enabling the participants at the first planning group to input first content comprising any one or a combination of text and images, and a first connection apparatus coupling the plurality of computerized appliances to the first electronic display apparatus and to a network;
a second planning group at a second physical location comprising a second electronic display apparatus visible to each of a plurality of participants interacting at the second planning group, a second video camera, a second plurality of computerized appliances enabling the participants at the second planning group to input second content, and a second connection apparatus coupling the plurality of computerized appliances to the second electronic display apparatus and to the network;
a server coupled to the network and to the first and second connection apparatus at the first and second planning groups, the server having a processor executing coded instructions from a non-transitory physical medium; and
a storage medium coupled to the server;
wherein the server operates to process the first and second content input by the participants at the first and second planning groups and to display all the content simultaneously on the first and the second electronic display apparatus, the first video camera is positioned to capture a video image of one or more participants at the first planning group to be displayed in a specific region of the second electronic display apparatus at the second planning group, and the second video camera is positioned to capture a video image of one or more participants at the second planning group to be displayed in a specific region of the first electronic display apparatus at the first planning group.

2. The apparatus as claimed in claim 1, wherein the second video camera at the second locations is arranged on one side of a perpendicular center plane running through the second display and is oriented in such a manner that an optical axis of the second video camera is essentially directed toward a lateral edge on that side of the second display which is opposite the second video camera with respect to the center plane.

3. The apparatus as claimed in claim 2, wherein a distance between the second video camera and the second display is selected in such a manner that the camera records a subarea of the second content of the second display, which subarea extends from the center plane to a lateral edge of the output apparatus which is opposite the second video camera with respect to the center plane.

4. The apparatus as claimed in claim 1, wherein optical axes of the video cameras are oriented approximately at eye level with respect to the users.

5. The apparatus as claimed in claim 1, wherein the electronic displays display apparatuses are in the form of digital whiteboards.

6. The apparatus as claimed in claim 5, wherein the digital whiteboards have graphics-enabled screens, preferably LED or plasma screens.

7. The apparatus as claimed in claim 6, wherein the screens are touch-sensitive, with the result that it is possible to manipulate the content directly on the screens.

8. The apparatus as claimed in claim 5, wherein the digital whiteboards have projectors for projecting the content to be reproduced onto a projection screen.

9. The apparatus as claimed in claim 8, wherein the projection screen is touch-sensitive, with the result that it is possible to manipulate the content directly on the projection screen.

10. The apparatus as claimed in claim 1, wherein the content comprises virtual post-it notes or placeholders for audio contents.

11. The apparatus as claimed in claim 1, further comprising manipulating second content at the second display generating new content superimposed on the first display, changing the existing first content, changing the color and/or size of the first content, deleting the first content, changing the positions of the first content on the first display or grouping or regrouping first display.

12. The apparatus as claimed in claim 1, wherein the server processing the content controls the access rights of users to the content reproduced on the displays.

13. The apparatus as claimed in claim 1, wherein the storage occurs at predefinable times or after predefinable events have occurred or manually in response to a command from one of the users.

14. The apparatus as claimed in claim 1, wherein the computerized appliances connected to the network for manipulating or inserting content include at least one of the following devices: mobile telephones, smartphones, PDAs, netbooks, laptops, tablet PCs, notebooks, digital pens and PCs.

15. The apparatus as claimed in claim 1, further including a connection apparatus enabled to connect different computerized terminals appliances which operate with different operating systems and communication protocols.

* * * * *